(12) United States Patent
Barr et al.

(10) Patent No.: US 7,389,435 B2
(45) Date of Patent: Jun. 17, 2008

(54) SYSTEM AND METHOD FOR THE FREQUENCY MANAGEMENT OF COMPUTER SYSTEMS TO ALLOW CAPACITY ON DEMAND

(75) Inventors: Andrew H. Barr, Roseville, CA (US); Ricardo Espinoza-Ibarra, Carmichael, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1241 days.

(21) Appl. No.: 10/216,438

(22) Filed: Aug. 12, 2002

(65) Prior Publication Data

US 2004/0028070 A1    Feb. 12, 2004

(51) Int. Cl.
*G06F 1/08* (2006.01)
(52) U.S. Cl. .................. 713/322; 713/100; 713/310
(58) Field of Classification Search ............... 713/100, 713/300, 310, 320, 322
See application file for complete search history.

(56) References Cited

U.S. PATENT DOCUMENTS 6,836,849 B2 * 12/2004 Brock et al. ............... 713/310

2002/0133729 A1    9/2002  Therien et al.

FOREIGN PATENT DOCUMENTS

EP          1329798 A1      7/2003
WO      WO 01/35200         5/2001

OTHER PUBLICATIONS

Search Report issued on Jan. 30, 2004 in counterpart foreign application in GB under application No. 315103.2.

* cited by examiner

*Primary Examiner*—Rehana Perveen
*Assistant Examiner*—Paul B Yanchus, III

(57) ABSTRACT

In a system and method for the frequency management of processors or blades to allow capacity on demand a requestor of the computer system develops a need for an increased performance from the computer system. The requester then sends a request to the grantor of the computer for an increase in the computer performance. If the grantor authorizes the request, the grantor sends the requestor the requisite information needed to increase the frequency associated with blades or processors in the computer system. The computer system is then operated at an increased frequency to satisfy the demand.

25 Claims, 6 Drawing Sheets

900

SYSTEM AND METHOD FOR THE FREQUENCY MANAGEMENT OF COMPUTER SYSTEMS TO ALLOW CAPACITY ON DEMAND

CROSS-REFERENCE TO RELATED APPLICATIONS

This application is related to U.S. patent application Ser. No. 10/216,437, entitled "SYSTEM, METHOD AND APPARATUS FOR THE FREQUENCY MANAGEMENT OF BLADES IN A BLADED ARCHITECTURE BASED ON PERFORMANCE REQUIREMENTS" to Andrew H. BARR, et al.; U.S. patent application Ser. No. 10/216,283, entitled "MANAGING AN OPERATING FREQUENCY OF PROCESSORS IN A MULTI-PROCESSOR COMPUTER SYSTEM" to Ricardo ESPINOZA-IBARRA, et al.; U.S. patent application Ser. No. 10/216,234, entitled "SYSTEM AND METHOD FOR LOAD DEPENDENT FREQUENCY AND PERFORMANCE MODULATION IN BLADED SYSTEMS" to Ricardo ESPINOZA-IBARRA, et al.; U.S. patent application Ser. No. 10/216,284, entitled "VOLTAGE MANAGEMENT OF BLADES IN A BLADED ARCHITECTURE BASED ON PERFORMANCE REQUIREMENTS" to Andrew H. BARR, et al.; U.S. patent application Ser. No. 10/216,286, entitled "VOLTAGE MODULATION IN CONJUNCTION WITH PERFORMANCE OPTIMIZATION AT PROCESSOR LEVEL" to Andrew H. BARR, et al.; U.S. patent application Ser. No. 10/216,285, entitled "SYSTEM AND METHOD FOR MANAGING THE OPERATING FREQUENCY OF PROCESSORS OR BLADES" to Ricardo ESPINOZA-IBARRA, et al.; U.S. patent application Ser. No. 10/216,229, entitled "SYSTEM AND METHOD FOR MANAGING THE OPERATING FREQUENCY OF BLADES IN A BLADED-SYSTEM" to Ricardo ESPINOZA-IBARRA, et al.; U.S. patent application Ser. No. 10/216,233, entitled "VOLTAGE MANAGEMENT OF PROCESSORS IN A BLADED SYSTEM BASED ON LOADING" Andrew H. BARR, et al.; U.S. patent application Ser. No. 10/216,232, entitled "SYSTEM AND METHOD FOR VOLTAGE MANAGEMENT OF A PROCESSOR TO OPTIMIZE PERFORMANCE AND POWER DISSIPATION" to Andrew H. BARR, et al., and U.S. patent application Ser. No. 10/216,435, entitled "MANAGEMENT OF A MEMORY SUBSYSTEM" to Andrew H. BARR, et al., all of which are concurrently herewith being filed under separate covers, the subject matters of which are herein incorporated by reference.

BACKGROUND

Bladed servers, or bladed computer systems, are computing systems that provision servers or other computer resources on individual cards, or blades. There are many types of blades—server blades, storage blades, network blades, etc.—and one or more of each type of blade is typically housed together in a single structure, thus creating high-density computing systems with modular architectures, ensuring flexibility and scalability of the systems, and reducing space requirements. Server blades, along with storage, networking, and other blades, are typically installed in a rack-mountable enclosure, or chassis, which hosts multiple blades. The multiple blades share common resources such as cabling, power supplies, and cooling fans.

The telecommunications industry has been using blade server technology for many years. More generally, the condensed blade server architecture benefits people and businesses that: (1) use the Internet to generate revenue and to provide services to customers; (2) are moving some of their business processes to the Web; and/or (3) need the flexibility to deploy Internet-edge applications in their own data center. Because of recent developments in technology, blade servers are now used for applications such as Web hosting, Web caching, and content streaming.

In Web caching applications, frequently-requested Web content is stored closer to the user, thus allowing for quicker retrieval of objects by the user and reducing the time and bandwidth required to access the Internet. Since companies and individuals are now streaming media (e.g., video and audio) to more effectively communicate both internally and externally, a massive growth of rich media content delivery on the Internet has occurred. Bladed servers are being used to meet the new demands created as a result of this growth.

Though bladed servers provide many advantages, several engineering challenges arise when using bladed servers. Among these challenges is the challenge of designing and operating a bladed system such that sufficient heat is dissipated in the limited space available in the chassis that hosts the system. Some known power limiting strategies include powering down a CPU functional unit, e.g., a floating-point unit or an on-die cache, or trading off speed for reduced power consumption in a hard drive. To address heat dissipation challenges, bladed server systems are designed within an underlying power and thermal envelope. For example, when a chassis that hosts a bladed system has a limited amount of airflow available to cool the blades (i.e., when the system can only dissipate a limited amount of heat), then the chassis is designed for a limited amount of power consumption and an associated limited performance of the blades.

Engineering challenges currently occur in bladed systems when a user wishes to increase the capacity or performance of a bladed system, i.e., increase the capacity of the system on demand. Some bladed computer systems are sold with an infrastructure in place for a specific amount of capacity based on future requirements. Initially, only a portion of the system is turned on and available for the customer to use. As the user's future requirements increase, e.g., performance or memory, the user may request more capacity on demand and alter the system to increase the performance of the system.

Prior solutions required a user to purchase new, additional, or upgraded hardware to add to the system. This method of increasing the capacity on demand requires an expert in hardware configuration to reconfigure the hardware.

Another known method of increasing the capacity on demand includes shipping a bladed system to a customer that includes components that are not turned on or available for use by the user of the system. For example, a typical application of this method would be to turn on an additional processor as the user's need increased. This method requires the component or processor to sit for an undetermined amount of time, and therefore, the capacity of the system to be increased in discrete units, i.e., by one or more processors.

SUMMARY

In one embodiment of the system and method of frequency management of processors or blades to allow capacity on demand, a requestor of a computer system sends a request to a grantor for an increase in the computer performance due to an increased need for performance. If the grantor authorizes the request, the grantor sends the requestor the requisite information needed to increase the frequency associated with blades or processors in the computer system. The computer system is then operated at an increased frequency to satisfy the demand.

In another embodiment of the system and method of frequency management of processors or blades to allow capacity on demand, a processor or blade is operated at a specific frequency to satisfy a level of performance required by the requester of the computer system. When the requestor's requirements change, a management means is used to generate a control signal that is used by the clock generator to generate the required specific frequency. The increased frequency satisfies the requestor's need for increased capacity.

DESCRIPTION OF THE DRAWINGS

The detailed description will refer to the following drawings, wherein like numerals refer to like elements, and wherein.

DETAILED DESCRIPTION

Figure 1:
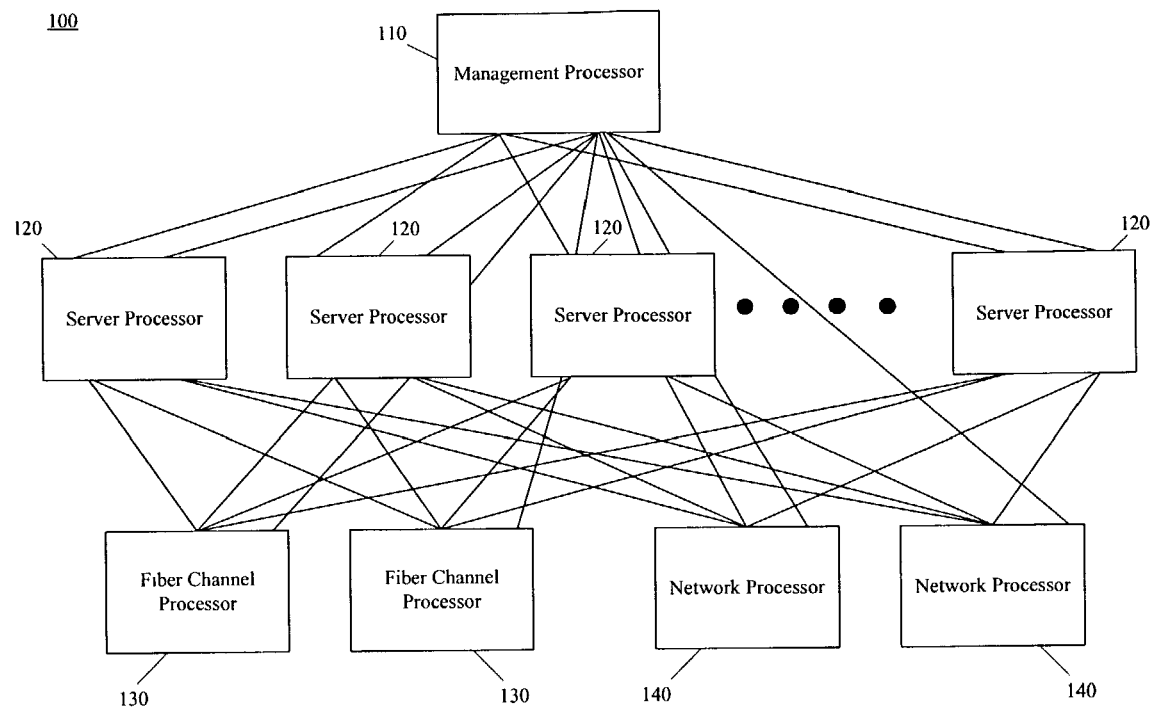
FIG. 1 shows a block diagram depicting one embodiment of the basic modular building blocks of a bladed architecture system.

The preferred embodiments of the frequency management of processors or blades to allow capacity on demand, will now be described in detail with reference to the following figures, in which like numerals refer to like elements. With reference to FIG. 1 of the Drawings, there is illustrated therein a block diagram depicting one embodiment of the basic modular building blocks of a bladed architecture system, as generally designated by the reference numeral 100. A management blade 110 supervises the functions of the chassis and provides a single interface to the consoles of all the servers installed. As shown in FIG. 1, server blades 120 are in communication with the management blade 110. The server blades 120 are, in turn, in communication with other blades that perform specific functions. For example, as seen in the figures, server blades 120 are in communication with fiber channel blades 130 and network blades 140. It is to be appreciated that the various blades in a bladed architecture system may be processor blades, server blades, network blades, storage blades or storage interconnect blades, etc.

As discussed, it is common for bladed system manufacturers to ship systems that do not have all of the processors turned on, or activated, for the customer to use. This practice of capacity on demand, allows the customer to turn on the unused processors at a later date as the requirements for the customer's system changes. For example, as illustrated in FIG. 1, prior art systems may be shipped with only a limited number of the server blades 120 activated. As the system user's requirements change, the user may request for the manufacturer to turn on, or make available for use, the unused blades or processors. Alternatively, the user may request for the frequency of the available processors to be increased so that the system runs at a more efficient level.

In alternative prior art solutions, the user may increase the capacity of the system by actually adding new hardware to the system. This method of increasing the capacity on demand, however, requires the additional purchase and delivery of additional or upgraded hardware and the physical reconfiguring of the hardware by an expert. For example, a user of the system illustrated in FIG. 1 may desire to increase the capacity of the system and purchase more server blades 120. This method would require delivery and reconfiguration by an expert. Both methods only allow the user and manufacturer in increase the capacity of the system in large increments that are the size of an entire processor's capacity.

The frequency management of processors or blades to allow capacity on demand enables manufacturers and users of a system to alter the capacity of a computer system by changing the frequency levels of the processors within the bladed system to increase or decrease the performance of the system in order to meet the user's requirements. Thus, a manufacturer can ship a processor or blade at a given frequency, and then increase the frequency in the future to provide additional performance. In one embodiment a user may increase the capacity of the system by entering coded information into a user interface. In other embodiments, the frequency of the individual processors or blades may be increased by physical manipulation of a control device on the system.

FIGS. 2-7 illustrate various methods for altering the frequency of individual blades or processors to allow capacity on demand. In some bladed architectures the processor core frequency of the CPU is asynchronous to the bus operating frequency; therefore, a change to the processor core frequency can be made independently of the system bus frequency. Currently, Hewlett Packard uses the SPHYR-T ASIC as a frequency-synthesizer for generating the processor clock of the PA-RISC systems. However, one skilled in the art would readily recognize that other synthesizers may also be used. In other embodiments of processor architectures, e.g., IA-32 and IA-64, the processor core frequency of the CPU is not necessarily asynchronous to the bus operating frequency. In IA processors the processor core frequency runs at a programmable multiple of the bus operating frequency. Managing the operating frequency of individual processors can be applied to both architectures by modifying the output of the clock chip, and thus, setting the processor frequency accordingly.

Generally, frequency synthesizer chips used to generate the processor's clocks have parallel or serialized configuration bits that allow one to choose the ratio of the input clock to the output clock (synthesized frequency). This allows one to run the processors at a different frequency upon reboot. The frequency synthesizer typically has an input frequency from a core crystal. Through controlling the serial or parallel pins, the frequency synthesizer provides the output frequency ratio that is sent to the processors.

One skilled in the art would also appreciate that if multiple frequency synthesizers are utilized, i.e., two (for a 2-way system) or N (for an N-way system), to generate the processor's clocks, the processors are able to operate at different frequencies within the range of frequencies supported by the processor. FIGS. 2-7 illustrate different methodologies of the how the ratio pins of the different frequency synthesizers can be controlled.

Figure 2:
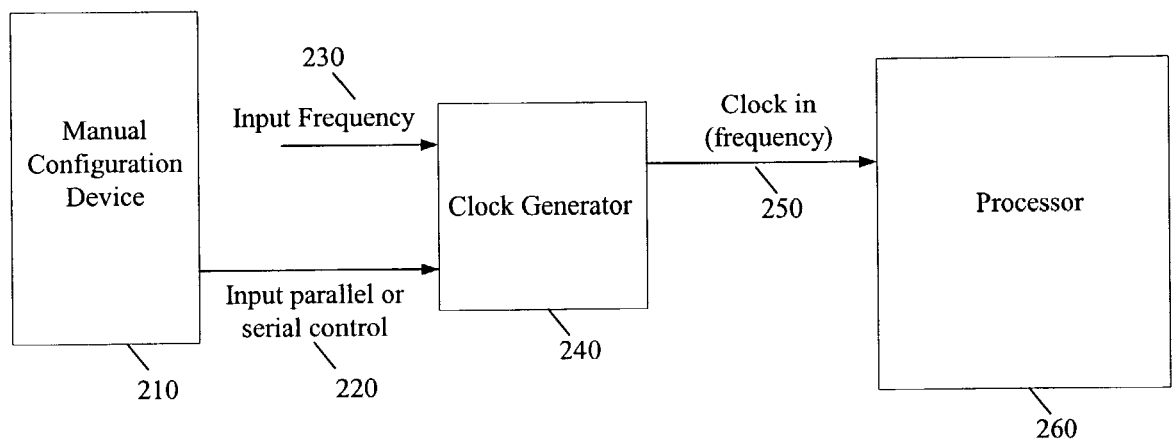
FIG. 2 illustrates a block diagram depicting one methodology of managing the operating frequency of individual blades or processors by use of a manual configuration device.

With reference now to FIG. 2 of the Drawings, there is illustrated therein a block diagram depicting one methodology of managing the operating frequency of individual processors to allow capacity on demand by use of a manual configuration device 210, as generally designated by the reference numeral 200. As seen in the FIGURE, the manual configuration device 210 is added to a readily accessible part of the system. Thus, the operator is allowed to set the frequency of the processors upon reboot of the unit, based on predetermined performance requirements. One of ordinary skill in the art would recognize that there are many common manual configuration devices that are capable of performing the desired function, e.g., dip switches, jumpers installed over pin headers, rotational configuration switches, and solder bridges, etc. An input frequency 230 and signal 220 from the manual configuration device 210 are used to generate an output frequency 250 at a clock generator, or frequency synthesizer 240 that is used by the processors for blade 260. Thus, if a user of the system needed to increase the performance level of the system, an authorized agent or user of the system who acquired authorized access to the manual configuration device could then change the frequency level of at least one processor to change the capacity of the overall system. It is to be appreciated that this method of changing the frequency of the blade by use of a manual configuration device, and the other methods described herein below, may be applied to various types of bladed architectures, including PA-RISC, DEC Alpha, MIPS, PowerPC, SPARC, IA-32 and IA-64.

Figure 3:
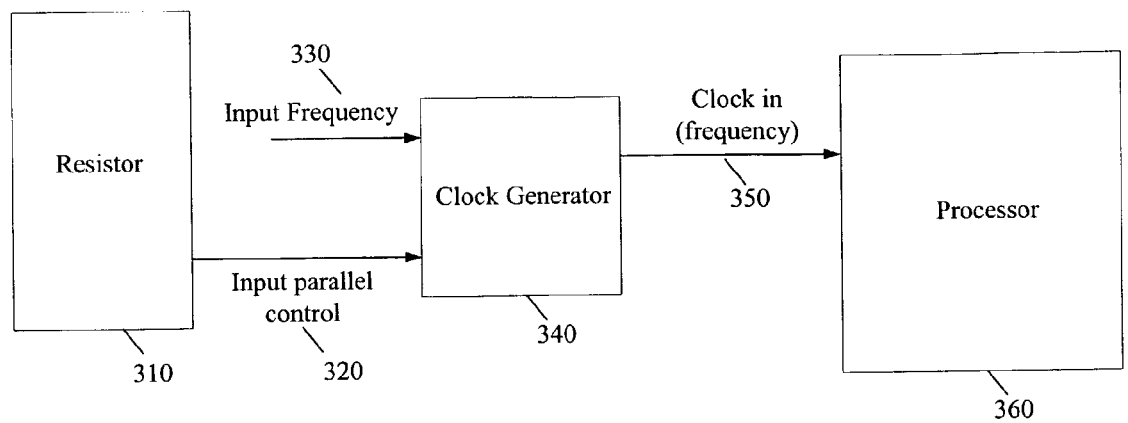
FIG. 3 illustrates a block diagram depicting another method of managing the operating frequency of individual blades or processors by use of resistors.

With reference now to FIG. 3 of the Drawings, there is illustrated therein a block diagram depicting another method of managing the operating frequency of individual processors or blades to allow capacity on demand, as generally designated by the reference numeral 300. Method 300 manages the operating frequency of individual processors by use of a resistor 310. As seen in FIG. 3, the resistor 310 is added to a readily accessible part of the system. Thus, the operator is allowed to set the frequency of the blades upon reboot of the unit, based on predetermined performance requirements. An input frequency 330 and signal 320 from the resistor 310 are used to generate an output frequency 350 at the clock generator 340 that is used by processors on the blade 360. Thus, if a user of the system needed to increase the performance level of the system, an authorized agent or user of the system who acquired authorized access to the resistor could then change the frequency level of at least one processor to change the capacity of the overall system.

Figure 4:
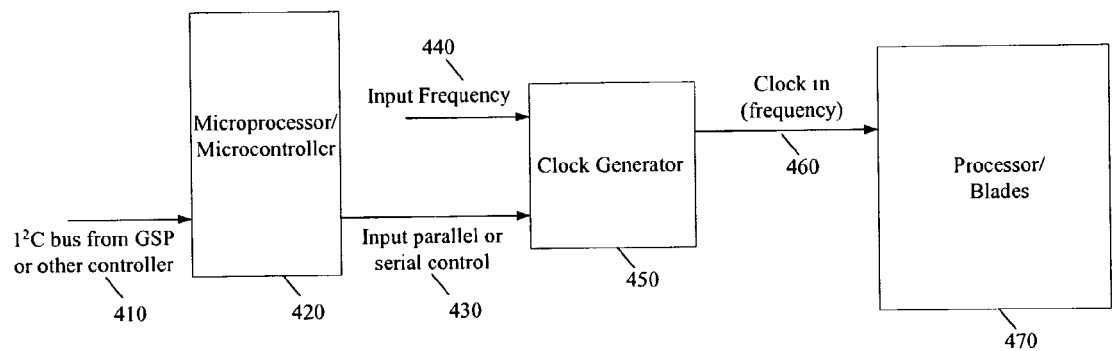
FIG. 4 illustrates a block diagram depicting another method of managing the operating frequency of individual blades or processors by use of a microcontroller or microprocessor.

With reference now to FIG. 4 of the Drawings, there is illustrated therein a block diagram depicting the method of managing the operating frequency of processors to allow capacity on demand by use of a microcontroller or microprocessor 420, as generally designated by the reference numeral 400. The microcontroller or microprocessor 420 is used to interface with the user of the system to ask for the specific frequency at which each processor should run. As seen in FIG. 4, microcontroller or microprocessor 420 receives a signal on an I$^2$C (Inter-IC) bus 410 from a GSP (Guardian Service Processor) or other controller. As is known in the art, an I$^2$C bus is a bi-directional two-wire serial bus that provides a communication link between integrated circuits. A person of ordinary skill in the art would readily recognize that other control buses could perform the same functions and be substituted for the I$^2$C bus described herein. The microcontroller or microprocessor 420 outputs a parallel or serial control 430, based upon the specific frequency designated by the user. A clock generator 450 uses an input frequency 440 and parallel or serial control signal 430 to generate an output frequency 460 used by a designated blade 470. The use of the microcontroller or microprocessor 420 allows the user to control the frequency synthesizers in a more transparent way than the above described register and manual configuration device methods, i.e., the user does not necessarily need to know how the settings of the configuration bits will affect the output.

This method of controlling the frequency level of the individual blades or processors to allow capacity on demand allows a manufacturer to change the performance and frequency level of the system without giving the user or customer unlimited access to the control of the frequency levels. For example, when a user requests more capacity for the system, the manufacturer may then disseminate to the user a code to enter into a user interface that is then transmitted to the microcontroller or microprocessor 420. The microcontroller or microprocessor will then generate the appropriate control 430 to alter the frequency of the processor accordingly.

Figure 5:
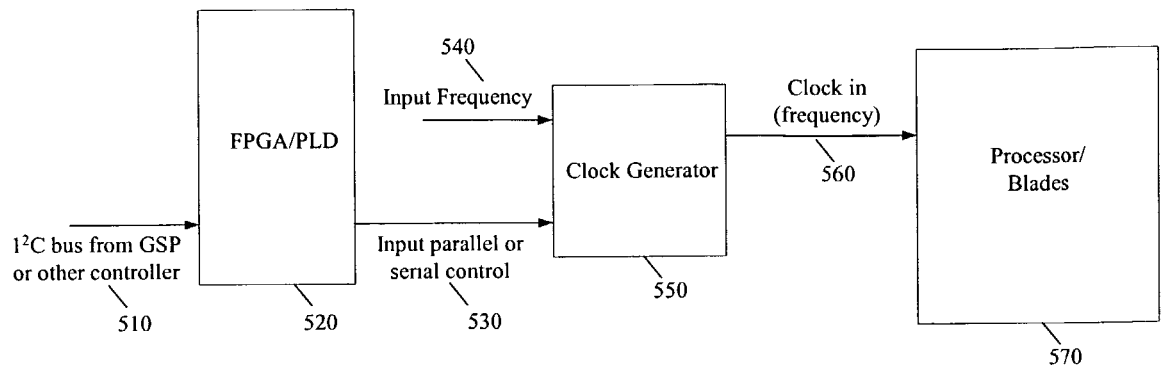
FIG. 5 illustrates a block diagram depicting another method of managing the operating frequency of individual blades or processors by use of a field-programmable gate array (FPGA) or programmable logic device (PLD)

With reference now to FIG. 5 of the Drawings, there is illustrated therein a block diagram depicting the method of managing the operating frequency of processors in a bladed system by use of a FPGA (field-programmable gate array) or PLD (programmable logic device) 520, as generally designated by the reference numeral 500. As is known to those skilled in the art, an FPGA is a chip that can be programmed in the field after manufacture. The FPGA or PLD 520 is used to receive commands from a higher-level device, e.g., the GSP via an I$^2$C bus 510, to control the configuration bits for the frequency synthesizer (or each synthesizer). As seen in FIG. 5, a clock generator 550, uses an input frequency 540 and the control from the FPGA/PLD 530 to generate an output frequency 560 used by a processor or blade 570. Like the use of the microcontroller/microprocessor 420 described in FIG. 4, the FPGA/PLD 520 allows the user to control the frequency synthesizers in a more transparent way, i.e., the user does not necessarily need to know how the settings of the configuration bits will affect the output.

Similar to the method described in FIG. 4, the use of FPGAs and PLDs 520 allows a manufacturer to change the performance and frequency level of the system without giving the user or customer unlimited access to the control of the frequency levels. For example, when a user requests more capacity for the system, the manufacturer may then disseminate to the user a code to enter into a user interface that is then transmitted to the FPGA or PLD 520. The FPGA or PLD 520 will then generate the appropriate control 430 to alter the frequency of the processor accordingly.

Figure 6:
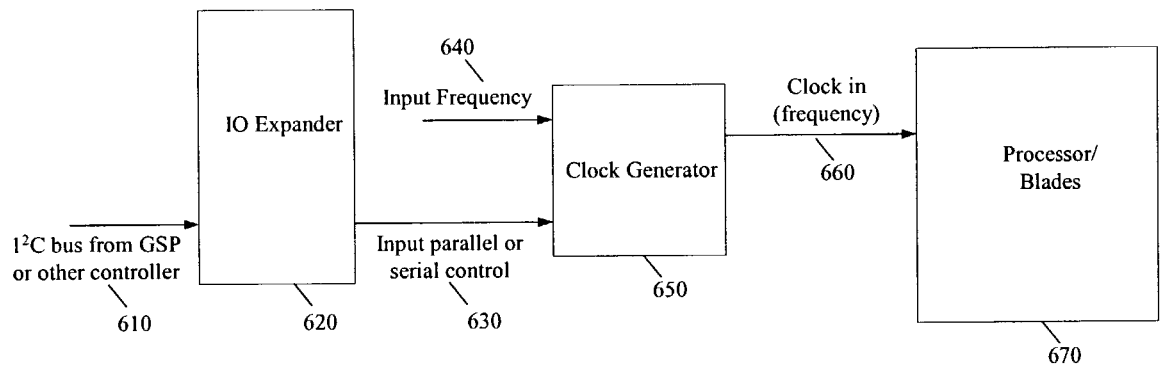
FIG. 6 illustrates a block diagram depicting another method of managing the operating frequency of individual blades or processors by use of an I/O-Expander chip (I/OX)

With reference now to FIG. 6 of the Drawings, there is illustrated therein a block diagram depicting the method of managing the operating frequency of the processors by use of an I/O-Expander chip (I/OX) 620, as generally designated by the reference numeral 600. As known in the art, an I²C based I/OX 620 is an inexpensive and simple solution that can be used to transparently control each frequency synthesizer. I/OX chips 620 have I/O ports, which can be forced to a particular state by writing to the I/OX through an I²C command. Since I/OX typically have multiple I/O ports, it is to be appreciated that one I/OX can be used to control multiple frequency synthesizers individually.

Since I/OX chips are I²C-based, they can be controlled by any device that supports an I²C interface. In Hewlett Packard's PA-RISC Blades, a logical such device would be the service processor, or GSP, of the PA Blade. The user-friendly interface of the GSP can be used to transparently allow the customer to control the frequency of the processors without need of any low-level information, e.g., bit-settings. The input from the GSP is designated in FIG. 6 by reference numeral 610. The user at the GSP inputs commands to increase the frequency of the processor. The GSP then delivers the required bits to change the ratio of the frequency generator, so that the processor will run at the desired level. The bit stream 610 is received by the I/OX 620. A clock generator 650 then uses an input frequency 640 and a control signal 630 to generate an output frequency 660 used by a processor 670.

Like the methods described in FIGS. 4 and 5, the use of I/O-Expander chips 620 allows a manufacturer to change the performance and frequency level of the system without giving the user or customer unlimited access to the control of the frequency levels. For example, when a user requests more capacity for the system, the manufacturer may then disseminate to the user a code to enter into a user interface that is then transmitted to the I/O-Expander chips 620. The I/O-Expander chips 620 will then generate the appropriate control 630 to alter the frequency of the processor accordingly.

Figure 7:
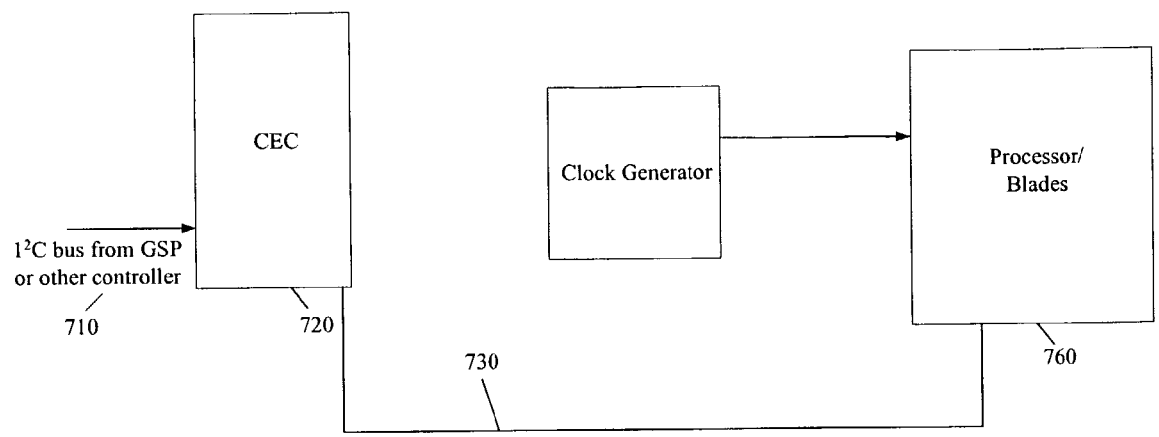
FIG. 7 illustrate therein a block diagram depicting the methods of managing the operating frequency of individual blades or processors in an IA based architecture system.

With reference now to FIG. 7 of the Drawings, there is illustrated therein a block diagram depicting the methods of managing the operating frequency of individual processors in an IA based architecture system, as generally designated by the reference numeral 700. As shown above, PA-based architectures have two frequency inputs that are taken into the processor: the processor core input and the bus input. In IA-based architectures the serial or parallel control is not modulated. IA-based architectures program the processor core frequency to generate a multiple of the bus frequency. The programming of the processor core frequency is done during early bus initialization using multipurpose bus lines 730. This is typically controlled by the main core chipset that sits on the processor bus (CEC) 720. Generally, a user interface, e.g., a GSP 710, is used to program the CEC 720 to generate the appropriate control signal 730 during early system and bus initialization. The bus frequency is multiplied for a larger ratio to generate a higher frequency, performance and power, or for a smaller ratio to generate a lower frequency, performance and power, depending on the application at the particular processor 760.

As discussed, the above described methodologies may be used to modulate the frequency at the blade system level or the processor level. For example, as illustrated in the above figures, the clock in frequency is sent to the respective blocks labeled Processor/Blade. The frequency may be sent with the intention of changing the frequency of all the processors on the blade, i.e., changing the frequency of the blade. Or, alternatively, the frequency may be sent with the intent of changing the frequencies of the processors individually, e.g., to adjust the trade off between master and slave processors. The frequency generated from the synthesizer is used to adjusts a processor on the blade.

Figure 8:
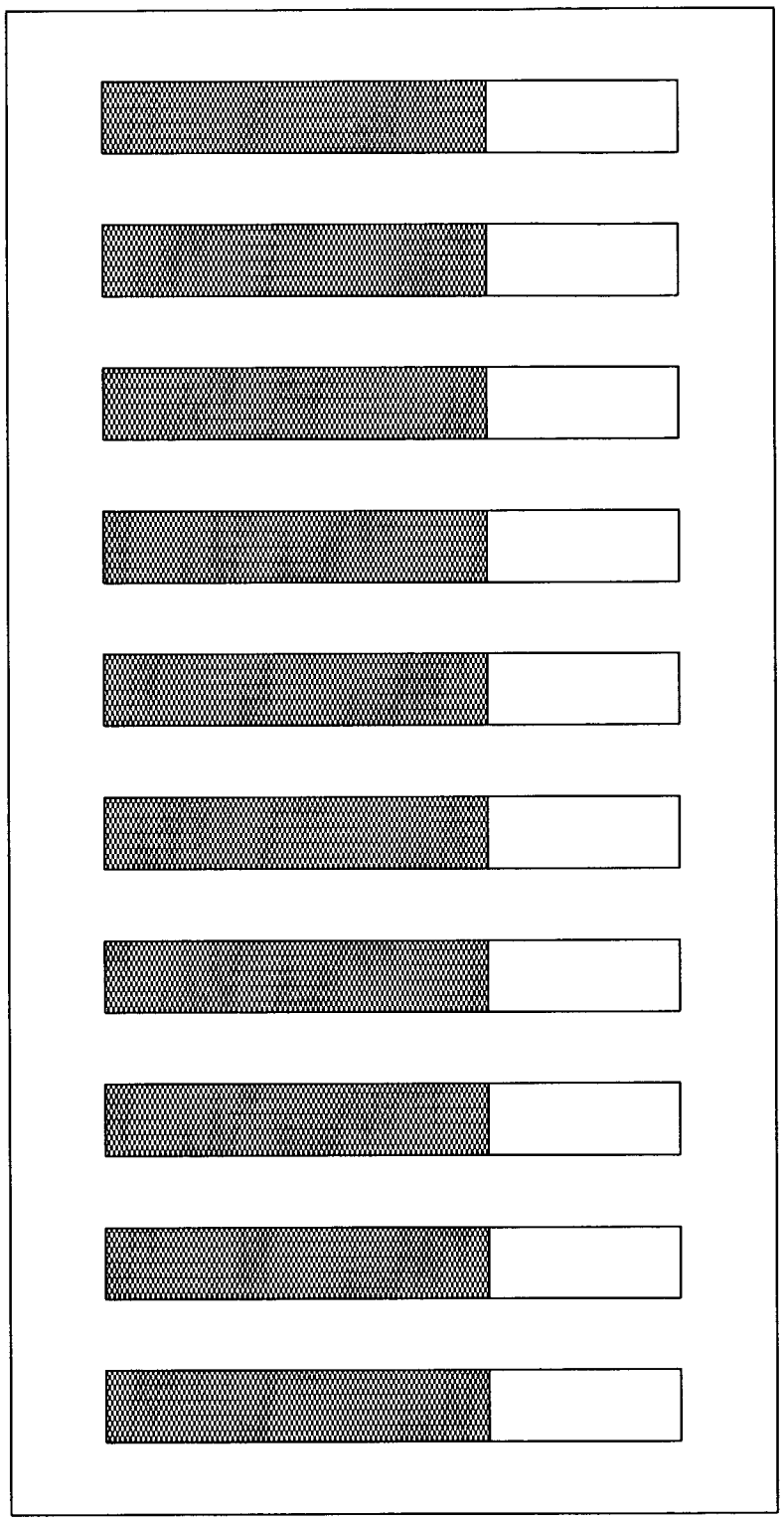
FIG. 8 illustrates a block diagram depicting a series of processors inside of a bladed architecture chassis operating at the same frequency level.

With reference now to FIG. 8 of the Drawings, there is illustrated therein a block diagram depicting a series of processors inside of a bladed architecture chassis running at the same frequency, as generally designated by the reference numeral 800. Operating processors at the same frequency is typical in current bladed architecture systems. One reason for operating all the processors at the same frequency level is to adhere to the underlying power and thermal envelope. The processors within the blades are thus limited in their ability to operate at optimal performance and capacity because the processors are configured to operate at the same frequency—a frequency below their maximum level.

Figure 9:
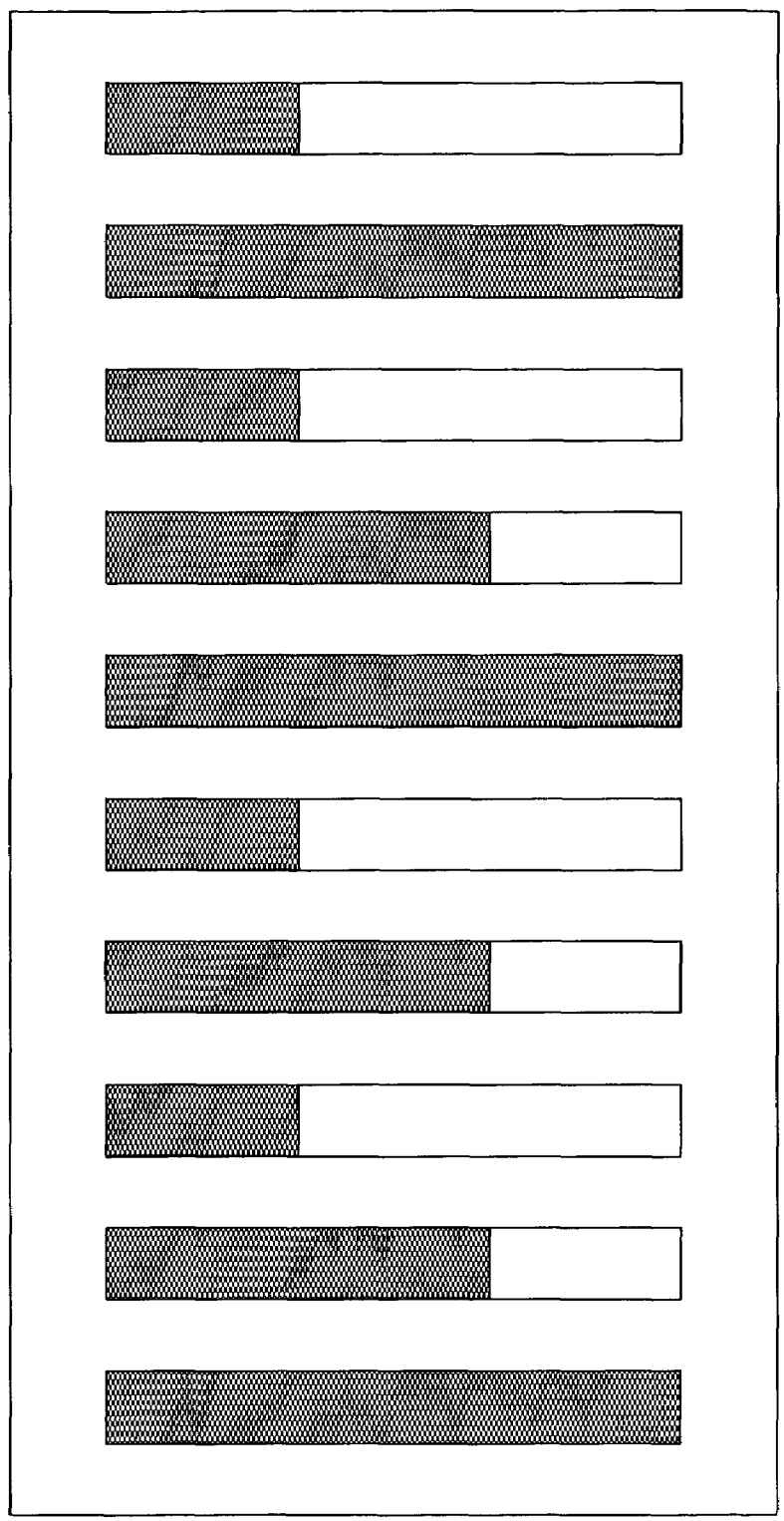
FIG. 9 illustrates a block diagram depicting a series of processors inside of a bladed architecture chassis operating at the different frequency levels after the requestor has requested a change in the capacity on demand.

With reference now to FIG. 9 of the Drawings, there is illustrated therein a block diagram depicting processors in a bladed architecture chassis running at different frequencies based upon capacity on demand, as generally designated by the reference numeral 900. The shading of the figure indicates the level of the frequency at which the processor is being run, e.g., processors with more shading are being run at a higher frequency. The FIG. 9 illustrates the operating frequency of the various processors in the system after the user has altered the operating frequencies in order to reach the desired capacity that is required by the user at that time. For example, a user of the system illustrated in FIG. 8 may develop needs that require more performance from the chassis. The user then informs the manufacturer of the new needs and the manufacturer may then sell the user more capacity to meet the needs for the increased performance. A manufacturer may then give the user a code to enter into the system to increase performance or, alternatively, the manufacturer may use controls on the system, e.g., via manual configuration devices or resistors, to alter the frequency of the processors.

This method of meeting the capacity on demand allows the user to increase the capacity or the performance of a system without changing or physically upgrading hardware. In addition, by meeting capacity on demand via frequency control users can increment capacity on an arbitrarily small scale. For example, a user can increase capacity by a percentage of performance. That is, a user can now buy an extra ten percent of performance. Prior solutions required a user to increment performance in units of entire processors.

In addition, by meeting capacity on demand via frequency management, it is no longer necessary to deploy hardware in an inactivated state for future use. Now, a processor (or blade in a bladed architecture) can be configured and run at a diminished capacity, yet still provide use for the customer and then later upgraded to a greater capacity or performance.

It is to be appreciated that the terms "user" and "manufacturer" used throughout the specification are meant to be construed as representative of larger groups that may perform the same function. For example, a user may indeed be a single end user of a computer system and the manufacturer could be the actual manufacturer of the computer. However, it is to be appreciated that the term user could be a wide range of requesters. For example, a requester may be a value added reseller or a corporate IT professional.

As illustrated above, the manufacturer, or grantor, grants the requestor access to the system to meet capacity on demand. Similarly, the grantor may in actuality be a wide variety of entities or individuals. The grantor may be the actual manufacturer, original equipment manufacturer, a value added reseller, etc.

A variety of combinations are possible. For example, the requesters and grantors may both be end users where a corporate IT department authorizes individual departments of the corporation to have access to certain resources.

It is to be appreciated that the principles disclosed herein may be applied to a system comprised of processors or blades that share a common chassis or to an architecture system that spans multiple chassis. That is, the principles may be applied to systems that are divided by either a physical or logical partition. For example, physically, a system may include three chassis, with each chassis having eight processors. Logically, the same system could be partitioned into five different web servers for five different customers. Power constraints within a chassis typically concern the physical partition of the system. Power constraints imposed on a customer or application that is located in multiple chassis, typically concern logical partitions. One of ordinary skill in the art would readily recognize that the innovations described above may be applied to both physically and logically partitioned architectures.

While the systems and methods for frequency management of processors or blades to allow capacity on demand has been described in connection with exemplary embodiments, those skilled in the art will understand that many modifications in light of these teaching are possible, and this application is intended to cover any variation thereof.

For example, the disclosed system and method makes use of specific $I^2C$ devices that are used to receive signals from an $I^2C$ bus. Other $I^2C$ devices could likewise be used. Thus, the $I^2C$ devices shown and referenced generally throughout this disclosure, and unless specifically noted, are intended to represent any and all devices/technologies appropriate to perform the desired function. Likewise, there are disclosed several processors and blades that perform various operations. The specific processor or blade is not important to the disclosure. Thus, it is not applicant's intention to limit this disclosure to any particular form of processor, blade or specific blade architecture.

Further examples exist throughout the disclosure, and it is not applicant's intention to exclude from the scope of this disclosure the use of structures, materials, or acts that are not expressly identified in the specification, but nonetheless are capable of performing a claimed function.

The invention claimed is:

1. A method for meeting the capacity on demand in a computer system, said method comprising the steps of:
   requesting, by a requester of said computer system, an increase of performance capabilities by said computer system;
   granting, by a grantor of said computer system, access to change the operating frequency of said computer system; and
   altering the operating frequency of said computer system, wherein said altering achieves the performance capabilities required by said requestor and maintains the overall power and thermal budget in said computer system and wherein said requestor alters the operating frequency of said computer system by inputting data from said grantor into a user interface of said computer system.

2. The method according to claim 1, wherein said requester is chosen from the group consisting of: an individual, a value added reseller and a corporate IT professional.

3. The method according to claim 1, wherein said grantor is chosen from the group consisting of: the actual manufacturer, an original equipment manufacturer, a corporate IT professional, and a value added reseller.

4. The method according to claim 1, wherein said step of altering the operating frequency, alters the operating frequency of at least one processor in said computer system.

5. The method according to claim 1, wherein said step of altering the operating frequency, alters the operating frequency of at least one blade in said computer system.

6. The method according to claim 1, wherein said requester of said computer system alters said frequency by creating a control signal with a device chosen from the group consisting of: a microcontroller, a microprocessor, a field-programmable gate array, a programmable logic device, an input-output expander chip and an $I^2C$ device.

7. The method according to claim 1, wherein said computer system is based on an architecture chosen from the group consisting of: DEC Alpha, MIPS, PowerPC, SPARC, PA-RISC, IA-32 and IA-64.

8. The method according to claim 1, wherein said computer system is physically partitioned.

9. The method according to claim 1, wherein said computer system is logically partitioned.

10. A computer system for meeting capacity on demand comprising:
    at least one blade, said blade operating at a specific performance level for performance requirements of said computer system, wherein a requestor of said computer system requests an increased level of performance as a percentage of performing capabilities of said computer system from the grantor of said computer system to meet a desired level of capacity of said at least one blade; and
    a control device, wherein said requestor inputs data into said computer system from said grantor to adjust said frequency level, wherein said control device generates a control signal to adjust the performance level of said at least one blade based upon a change in said performance requirements.

11. The method according to claim 10, wherein said requestor is chosen from the group consisting of: an individual, a value added reseller and a corporate IT professional.

12. The method according to claim 10, wherein said grantor is chosen from the group consisting of: the actual manufacturer, an original equipment manufacturer, a corporate IT professional, and a value added reseller.

13. The computer system according to claim 10, wherein the frequency level of individual processors is adjusted to modulate the frequency within at least one blade at the processor level.

14. The computer system according to claim 10, wherein the frequency level of at least one processor is adjusted to modulate the frequency within at least one blade at the blade level.

15. The control device according to claim 10, wherein said control device is chosen from the group consisting of: a microcontroller, a microprocessor, a field-programmable gate array, a programmable logic device, an input-output expander chip and an $I^2C$ device.

16. The computer system according to claim 10, wherein the operating frequency of said blade is adjusted by use of a device chosen from the group consisting of: a manual configuration device and a resistor.

17. A system for meeting the capacity on demand in a computer, said system comprising:
    at least one blade, said blade operating at a specific performance level for performance requirements of said computer; and a means for generating a control signal to adjust the performance level of said at least one blade based upon a change in said performance requirements, wherein the overall power and thermal budget in said computer is maintained and wherein the change is requested as a as a percentage of performance capabilities of said computer system.

18. The system according to claim 17, wherein a requester of said computer requests an increased level of performance from a grantor of said computer.

19. The system according to claim 18, wherein said grantor authorizes said requester to adjust the operating frequency of said blades or processors in said computer.

20. The system according to claim 19, wherein said requestor inputs data received from said grantor into said computer to adjust the frequency levels.

21. The system according to claim 20, wherein the frequency level of individual processors is adjusted to modulate the frequency within at least one blade at the processor level.

22. The system according to claim 20, wherein the frequency level of at least one processor is adjusted to modulate the frequency within at least one blade at the blade level.

23. The system according to claim 17, wherein said computer is physically partitioned.

24. The system according to claim 17, wherein said computer is logically partitioned.

25. A method for meeting the capacity on demand in a computer system, said method comprising the steps of:

requesting, by a requester of said computer system, an increase of performance capabilities by said computer system;

granting, by a grantor of said computer system, access to change the operating frequency of said computer system; and altering the operating frequency of said computer system, wherein said altering achieves the performance capabilities required by said requestor and maintains the over all power and thermal budget in said computer system, and wherein said requestor alters the operating frequency of said computer system by use of a device chosen from the group consisting of a manual configuration device and a resistor.

* * * * *